US 6,693,734 B2

(12) United States Patent
Il et al.

(10) Patent No.: US 6,693,734 B2
(45) Date of Patent: Feb. 17, 2004

(54) APPARATUS AND METHOD FOR CONTROLLING ELECTRO-OPTIC MODULATOR

(75) Inventors: Myong Seung Il, Daejon (KR); Kim Bong Kyu, Daejon (KR); Lee Jyung Chan, Daejon (KR); Hyun Jae Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

(21) Appl. No.: 10/087,874

(22) Filed: Mar. 1, 2002

(65) Prior Publication Data

US 2003/0107791 A1 Jun. 12, 2003

(30) Foreign Application Priority Data

Dec. 7, 2001 (KR) .......................................... 2001-77423

(51) Int. Cl.[7] .............................. G02F 1/03; G02F 1/01
(52) U.S. Cl. ....................... 359/245; 359/238; 359/239; 359/181
(58) Field of Search ................................ 359/237, 238, 359/239, 245, 264, 181, 187, 158

(56) References Cited

U.S. PATENT DOCUMENTS

| 6,046,838 A | 4/2000 | Kou et al. .................. 359/245 |
| 6,178,032 B1 * | 1/2001 | Huang et al. ............... 359/237 |
| 2001/0030791 A1 * | 10/2001 | Taneda ........................ 359/181 |
| 2002/0085194 A1 * | 7/2002 | Yamashita ................. 356/73.1 |

* cited by examiner

Primary Examiner—Georgia Epps
Assistant Examiner—Tim Thompson
(74) Attorney, Agent, or Firm—Blakely, Sokoloff, Taylor & Zafman (57) ABSTRACT

A control device for controlling an electro-optic modulator which receives an optical input signal, modulates the optical input signal with an electrical input signal and a bias voltage signal, and outputs the modulated optical signal is provided. The control device includes: a light source for providing the optical input signal used for the optical modulation to the electro-optic modulator; an optical input measuring unit for measuring the intensity of the optical input signal outputted by the light source; an optical output measuring unit for measuring the intensity of the optical output signal outputted by the electro-optic modulator; and a controller for adjusting the bias voltage signal and the gain of the electrical input signal depending on the intensity of the optical input signal and the optical output signal measured respectively by the optical input measuring unit and the optical output measuring unit. The control device can control the electro-optic modulator by initializing bias voltage and gain of an electrical signal so that the electro-optic modulator can operate in optimized conditions, thus preventing distortion of the optical output signal and obtaining the maximum extinction ratio. In addition, the control device can adjust the bias voltage adaptively during the operation of the electro-optic modulator.

14 Claims, 7 Drawing Sheets

APPARATUS AND METHOD FOR CONTROLLING ELECTRO-OPTIC MODULATOR

BACKGROUND OF THE INVENTION

1. Field of the Invention

The present invention relates to a control apparatus and a control method for stabilizing the operation of an electro-optic modulator included in an optical transmitter of an optical communication system or an optical transmission system, and more particularly, to an apparatus and a method for enabling an electro-optic modulator to maintain the type and the strength of an optical output signal even if a transfer function in the electro-optic modulator changes, thereby stabilizing the output of the electro-optic modulator.

2. Description of the Related Art

Generally, an electro-optic modulator includes two interferometric waveguides, and indicates periodical optical output characteristics by delaying phases of the waveguides. In the electro-optic modulator, a Radio Frequency (RF) electrode is positioned between two waveguides in order to induce the phase delay. In the electro-optic modulator, there is also a bias electrode designed to adjust a bias voltage. Inappropriate bias voltage of the electro-optic modulator may cause an optical output signal of the electro-optic modulator to be distorted.

An optical input signal, which carries an electrical dithering signal that has a frequency different from that of an electrical information signal, is applied to an existing apparatus for stabilizing optical outputs of the electro-optic modulator. To be more specific about the existing stabilization method, the optical output stabilizer extracts one of a primary wave, a secondary harmonic or an $N^{th}$ harmonic of the dithering signal. Then, the stabilizer detects an error signal corresponding to the variance of the frequency phase of the dithering signal, and stabilizes the output of the electro-optic modulator by controlling a bias voltage through the feedback control of the error signal.

However, a band filter is necessary to extract one harmonic from an optical detector, and due to noises after the band filtering, it is difficult to maintain an accurate operation point. If the dithering signal with higher amplitude is provided to the electro-optic modulator in order to reduce the impact of noises, the dithering signal may work as noises to the electrical signal indicative of information. In addition, it is hard to adapt to the change of the 180° phase modulation voltage.

SUMMARY OF THE INVENTION

To solve the above-described problems, it is an object of the present invention to provide an apparatus and a method for controlling an electro-optic modulator by initializing a bias voltage and gains of an electrical information signal so that the electro-optic modulator can operate in optimized conditions, thus enabling the electro-optic modulator to maintain stable characteristics of an optical output signal even if a transfer function of the electro-optic modulator changes.

It is another object of the present invention to provide an apparatus and a method for controlling an electro-optic modulator by adaptively adjusting a bias voltage applied to the electro-optic modulator in an optical transmitter so that the electro-optic modulator can maintain an optical output stable.

BRIEF DESCRIPTION OF THE DRAWINGS

The above object and advantages of the present invention will become more apparent by describing in detail preferred embodiments thereof with reference to the attached drawings in which.

*Explanation of Reference Numerals Designing the Major Elements of the Drawings

| | | | |
|---|---|---|---|
| 11 | light source | 12 | electro-optic modulator |
| 12 | optical input measuring unit | 14 | optical output measuring unit |
| 15 | controller | 16 | bias voltage adjustment unit |
| 17 | electrical signal gain adjustment unit | | |

DETAILED DESCRIPTION OF THE INVENTION

To achieve the above object, in a control device for controlling an electro-optic modulator which receives an optical input signal, modulates the optical input signal with an electrical input signal and a bias voltage signal, and outputs the modulated optical signal, the control device for controlling the electro-optic modulator according to the present invention includes:

a light source for providing the optical input signal used for the optical modulation to the electro-optic modulator;

an optical input measuring unit for measuring the intensity of the optical input signal outputted by the light source;

an optical output measuring unit for measuring the intensity of the optical output signal outputted by the electro-optic modulator; and a controller for adjusting the bias voltage signal and the gain of the electrical input signal depending on the intensity of the optical input signal and the optical output signal measured respectively by the optical input measuring unit and the optical output measuring unit.

To achieve the above object, in a method for initializing an electro-optic modulator which outputs a modulated optical signal in response to an optical input signal, the method includes:

applying a bias voltage signal having a certain range of voltage as a bias voltage to an electro-optic modulator;

obtaining the maximum operation voltage indicating the maximum optical intensity and the minimum operation voltage indicating the minimum optical intensity out of the detected optical outputs after the bias voltage signals having various bias voltages are applied;

setting up the mean voltage between the maximum operation voltage and the minimum operation voltage as an initial bias voltage; and performing an optical modulation in response to the electrical input signal by applying the bias voltage signal having the initial bias voltage.

To achieve the above object, in a method for initializing an electro-optic modulator which outputs a modulated optical signal in response to an optical input signal, the method includes:

applying a bias voltage signal having a certain range of voltage as bias voltages to an electro-optic modulator;

obtaining the maximum operation voltage indicating the maximum optical intensity and the minimum operation voltage indicating the minimum optical intensity out of the detected optical outputs after the bias voltage signals having various bias voltages are applied;

adjusting a gain of the electrical signal inputted to the electro-optic modulator based on the difference between the maximum operation voltage and the minimum operation voltage; and applying the bias voltage signal having an initial bias voltage and performing an optical modulation in response to the electrical input signal whose gain is adjusted.

To achieve the above object, in a method for controlling an electro-optic modulator which outputs a modulated optical signal in response to an optical input signal, the method includes:

(a) setting a reference on the relation between the intensity of the optical signal inputted to the electro-optic modulator and that of the optical signal outputted from the electro-optic modulator by applying a bias voltage signal having the initial bias voltage to the electro-optic modulator;

(b) measuring the intensity of the optical signal inputted to the electro-optic modulator and that of the optical signal outputted from the electro-optic modulator while performing an optical modulation in response to the electrical signal;

(c) obtaining the relation between the measured optical signals and comparing the obtained relation with the reference;

(d) adjusting the bias voltage based on the comparison result; and (e) performing an optical modulation by applying the bias voltage signal having the adjusted bias voltage to the electro-optic modulator, controlling the bias voltage of the bias voltage signal by repeating from (b) step to (e) step.

The above object and advantages of the present invention will become more apparent by describing in detail preferred embodiments thereof with reference to the attached drawings.

Figure 1:
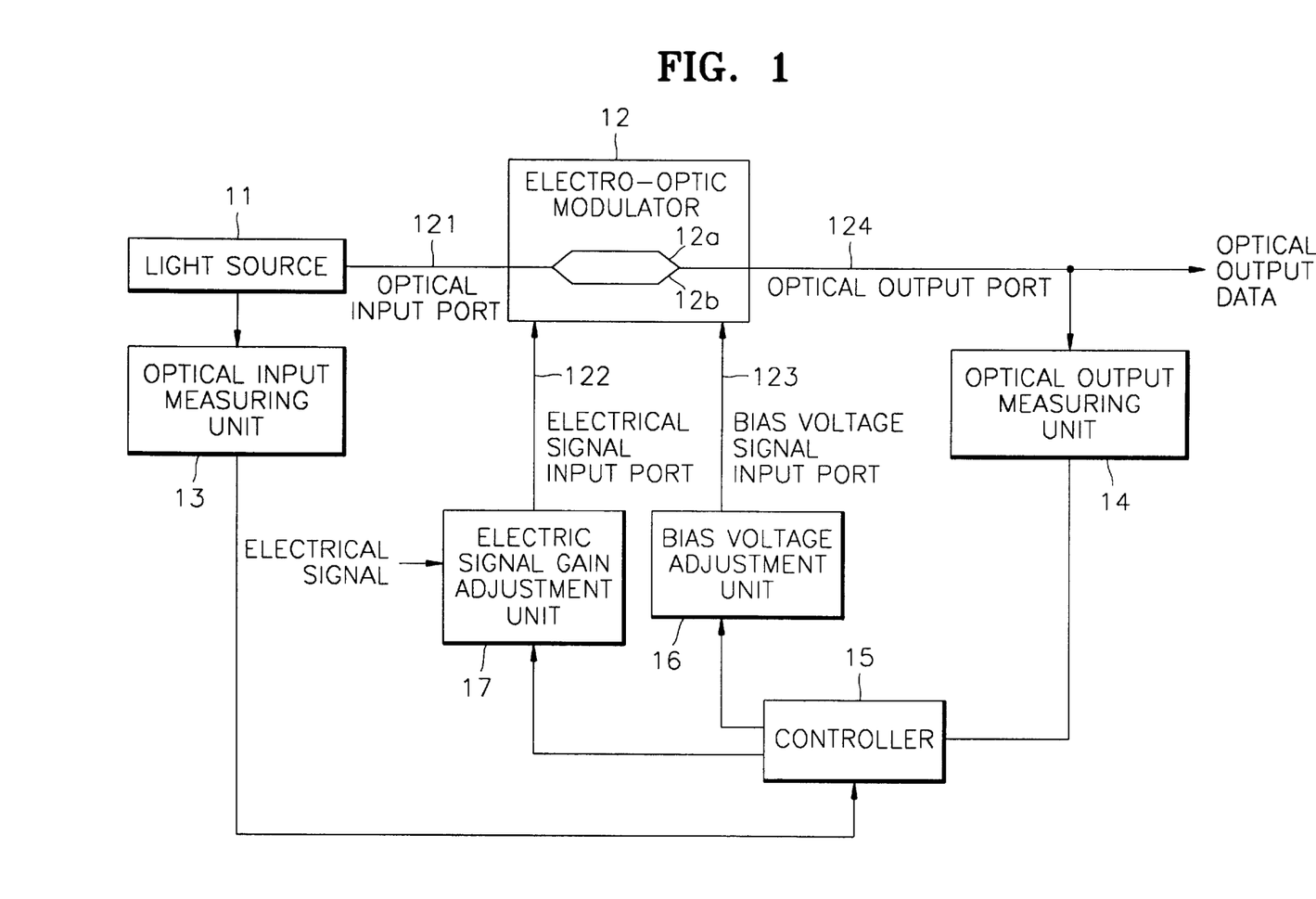
FIG. 1 is a block diagram of an electro-optic modulation device according to one embodiment of the present invention.

FIG. 1 is a block diagram of an electro-optic modulation device according to one embodiment of the present invention. The electro-optic modulation device includes an electro-optic modulator 12 connected with an optical input port 121, an electrical signal input port 122, a bias voltage signal input port 123 and an optical output port 124. The light source 11 inputs an optical signal to the electro-optic modulator 12 through the optical input port 121. The optical input measuring unit 13 measures the intensity of the inputted optical signal. The optical output measuring unit 14 measures the intensity of the optical signal outputted to the optical output port 124 of the electro-optic modulator 12. After information data to be modulated is converted into an electrical signal, the electrical signal is inputted to the electro-optic modulator 12. The optical output port 124, which outputs an optical signal in which the optical input signal is modulated by the electrical signal, is connected with an optical channel such as an optical fiber.

The light source 11 may be a laser diode which operates within 1550 nm wavelength bands, and generates an optical signal used as an optical carrier. The electro-optic modulator 12 receives the optical carrier through the optical input port 121, modulates the optical carrier depending on the electrical signal inputted from the electrical signal input port 122 and generates the modulated optical signal. The modulated optical signal is outputted through the optical output port 124. The optical output measuring unit 14 measures the intensity of the modulated optical signal using an optical coupler. The optical coupler extracts 5% or less of the modulated optical signals and the remaining modulated optical signals are outputted through the optical waveguides.

The electro-optic modulator 12 may be an interferometric modulator such as a Mach-Zender modulator. The optical carrier inputted from the light source 11 via the optical input port 121 is divided into two signals and transmitted to two optical waveguides 12a and 12b. The electrodes, which receive an electrical signal and a bias voltage signal respectively from the electrical signal input port 122 and the bias voltage input port 123, are positioned near to the two optical waveguides 12a and 12b. The electric field produced by these electrical signals causes a local change in the refractive index of the optical waveguides 12a and 12b, thus causing a relative phase shift between the optical carriers propagating in the two waveguides 12a and 12b. The relative phase shift preferably is proportional to the voltage of the applied electrical signal. At the optical output port 124 of the electro-optic modulator 12, the two optical signals destructively or constructively interfere there depending on the relative phase shift introduced in the two waveguides 12a and 12b. Therefore, the optical intensity of the optical output at the optical output port 124 is changed depending on the voltage of the electrical signal applied to the electrical signal input port 122.

The controller 15 measures the intensity of the optical input and the optical output, adjusts the gain of the electric signal and the magnitude of the bias voltage depending on the measurement result. The controller 15 may be implemented by a re-configurable element. The electric signal gain adjustment unit 17 receives the electric signal indicative of information and adjusts the gain of the electric signal by the adjustment of the controller 15. Then, the electric signal gain adjustment unit 17 applies the adjusted signal to the electro-optic modulator 12. The bias voltage adjustment unit 16 applies the bias voltage to the electro-optic modulator 12 so that the electro-optic modulator 12 can operate in the optimized condition. Adjustment of the gain of the electric signal and the bias voltage will be described later. First, how a transfer function of the electro-optic modulator 12 influences characteristics of an optical modulation will be described below.

Figure 2:
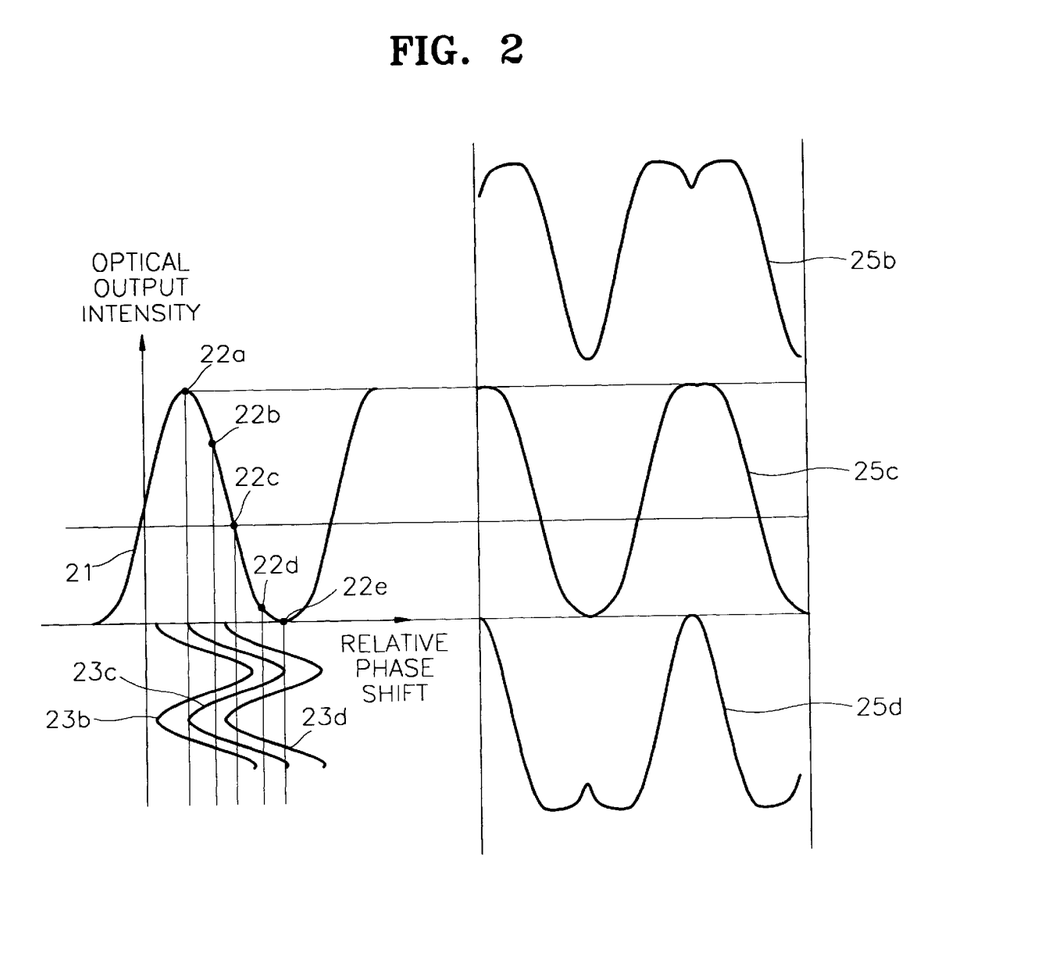
FIG. 2 is a graph showing relations between a relative phase shift between two waveguides of an electro-optic modulator and characteristics of optical outputs of the electro-optic modulator.

FIG. 2 is a graph showing relations between a relative phase shift between the two optical waveguides 12a and 12b of the electro-optic modulator 12 and optical output characteristics of the electro-optic modulator 12. Since the electro-optic modulator 12 is an interferometric modulator, the intensity of the optical output is calculated based on the cosine square function on the relative phase shift. The relative phase shift is in proportion to the voltage of the electrical signal. Therefore, the horizontal axis marked as "relative phase shift" indicates the voltage of the applied electric signal. The vertical axis of the graph indicates the intensity of the optical output of the electro-optic modulator and the curved line 21 indicates the transfer function of the electro-optic modulator.

In FIG. 2, the electrical signal applied to the electro-optic modulator is indicated as a curve 23b, 23c or 23d. The bias voltage is indicated as a point 22b, 22c or 22d on the curve of the transfer function. In this case, the optical output is indicated as a curve 25b, 25c or 25d. Therefore, the optimum operation point of the bias voltage applied is a point 22c. The optical output signal 25c at the operation point 22c can obtain the signal characteristics similar to the waveform of the electrical data signal 23c. However, if the bias voltages corresponding to points 22b and 22d other than the optimized position, the output waveforms such as 25b and 25d show distorted output characteristics different from those of electrical signals. Therefore, the bias voltage applied to the electro-optic modulator should be adjusted to become the optimized operation point 22c and to output the stable output signal 25c of the electro-optic modulator.

Even when the bias voltage is adjusted to become the optimized operation point, the bias voltage of the electro-optic modulator varies due to optical refraction effect of the media such as the optical waveguides, direct drift caused by the accumulated space charges and temperature variation as time passes. Therefore, because the optimum operation point changes during the operation of the electro-optic modulator, the optimum point of the bias voltage needs to be monitored continuously and the voltage value of the bias voltage signal inputted to the electro-optic modulator should be adjusted.

Figure 3:
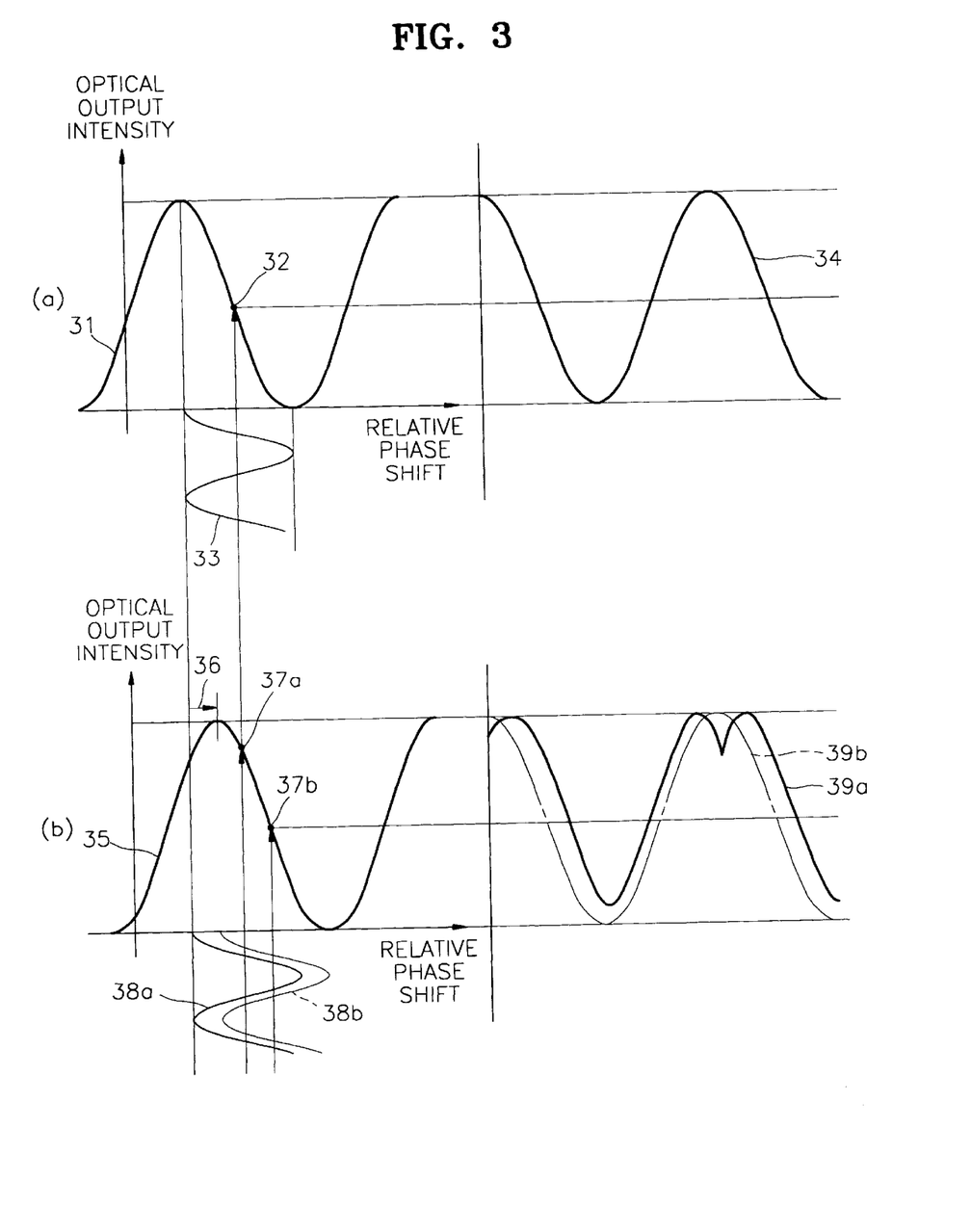
FIG. 3 is a graph showing a direct drift of the electro-optic modulator.

FIG. 3 is a graph showing a direct drift of the electro-optic modulator, which is caused by the optical refraction effect of the media such as optical waveguides, the accumulated space charges and temperature variation. FIG. 3(a) shows the output characteristics of the electro-optic modulator operating normally prior to the direct drift. FIG. 3(b) shows the output characteristics of the electro-optic modulator when the direct drift happens. In FIG. 3, the transfer function of the electro-optic modulator is changed from the curved line 31 of FIG. 3(a) to the curved line 35 of FIG. 3(b). Reference numeral 36 of FIG. 3(b) indicates the drift of the transfer function of the electro-optic modulator.

In the initial setup, if the bias voltage corresponding to the operation point 37a in FIG. 3(b) is applied, the drift 36 of the transfer function causes distortion of the output characteristic such as curved line 39a. To obtain the characteristics such as the normal output curve 34 of FIG. 3(a), the bias voltage should be shifted with the drift considered. That is, the bias voltage 37a prior to the drift should be shifted to the bias voltage 37b with the drift considered. Then, the normal output characteristic such as the output curve 39b can be obtained. That is, if the direct drift happens, the bias voltage should be shifted in order to obtain the desired optical output characteristic.

Figure 4:
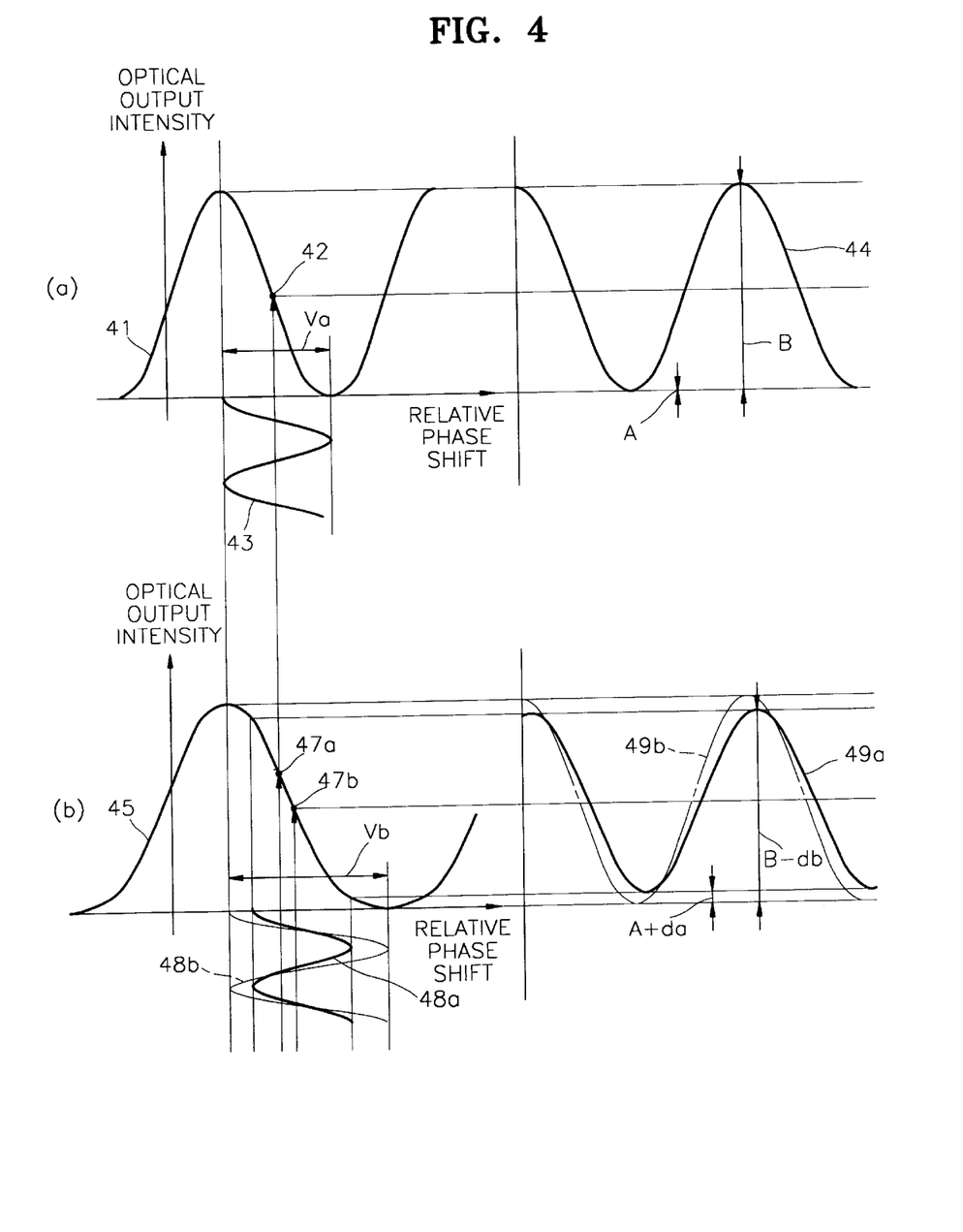
FIG. 4 depicts characteristics of 180° phase modulation voltage (Vpi) of the electro-optic modulator.

FIG. 4 shows the characteristics of the 180° phase modulation voltage (Vpi) of the electro-optic modulator 12, which is caused by the optical refraction effect of the media such as optical waveguides, the accumulated space charges and the temperature variation. The change of the characteristics of the 180° phase modulation voltage leads to the change of the maximum extinction ratio. The extinction ratio plays an important role in the transmission performance of the optical signals. FIG. 4(a) indicates the transfer function 41 in the initial operation status. FIG. 4(b) indicates the transfer function 45 after the characteristics are changed.

The electro-optic modulator divides the optic signal into two at the input port and transmits the divided signals through the two optical waveguides. The output port combines the optical signals transmitted via the two optical waveguides. The optical output signal is determined by the relative phase of the optical signals transmitted via the two optical waveguides. If the phases of the optical output signals from the two optical waveguides are the same each other, the intensity of the optical output signal is the sum of the optical signals transmitted via the optical waveguides. Therefore, the optical signal logic is outputted as "1". On the contrary, if the phase difference between the optical output signals from the two optical waveguides is 180°, the two optical signals are offset and there is no optical signal to be outputted. In that case, the logic "0" is outputted. The 180° phase modulation voltage (Vpi) refers to the gap between the maximum voltage value of the electric signal used to output the logic "1" and the minimum voltage value of the electric signal used to output the logic "0". Therefore, if the peak-to-peak voltage signal (Vp-p) of the electrical information signal, which is corresponding to the Vpi, are applied to the electro-optic modulator, the maximum extinction ratio can be obtained.

In FIG. 4(a), the 180° phase modulation voltage of the electro-optic modulator 12 is Va and the extinction ratio is B/A. However, with reference to FIG. 4(b), the 180° phase modulation voltage is increased to Vb due to the accumulated space charges and temperature variation. While the operation point is shifted from a point 47a to a point 47b in FIG. 4(b) in order to maintain the bias voltage as the optimum point, if the electrical signal 48a in FIG. 4(b) that has the same amplitude as that of the electrical signal 43 of FIG. 4(a) is applied, the extinction ratio of the optical output signals is reduced to (B−db)/(A+da). In order to obtain the maximum extinction ratio, the amplitude of the electrical information signal 48a applied to the electro-optic modulator is changed to that of a signal 48b. Then, the characteristics of the output curve 49b and a high extinction ratio can be obtained. Therefore, it is necessary to consider that the 180° phase modulation voltage changes as time passes, and adjust the amplitude of the electrical signal inputted to the electro-optic modulator.

Figure 6:
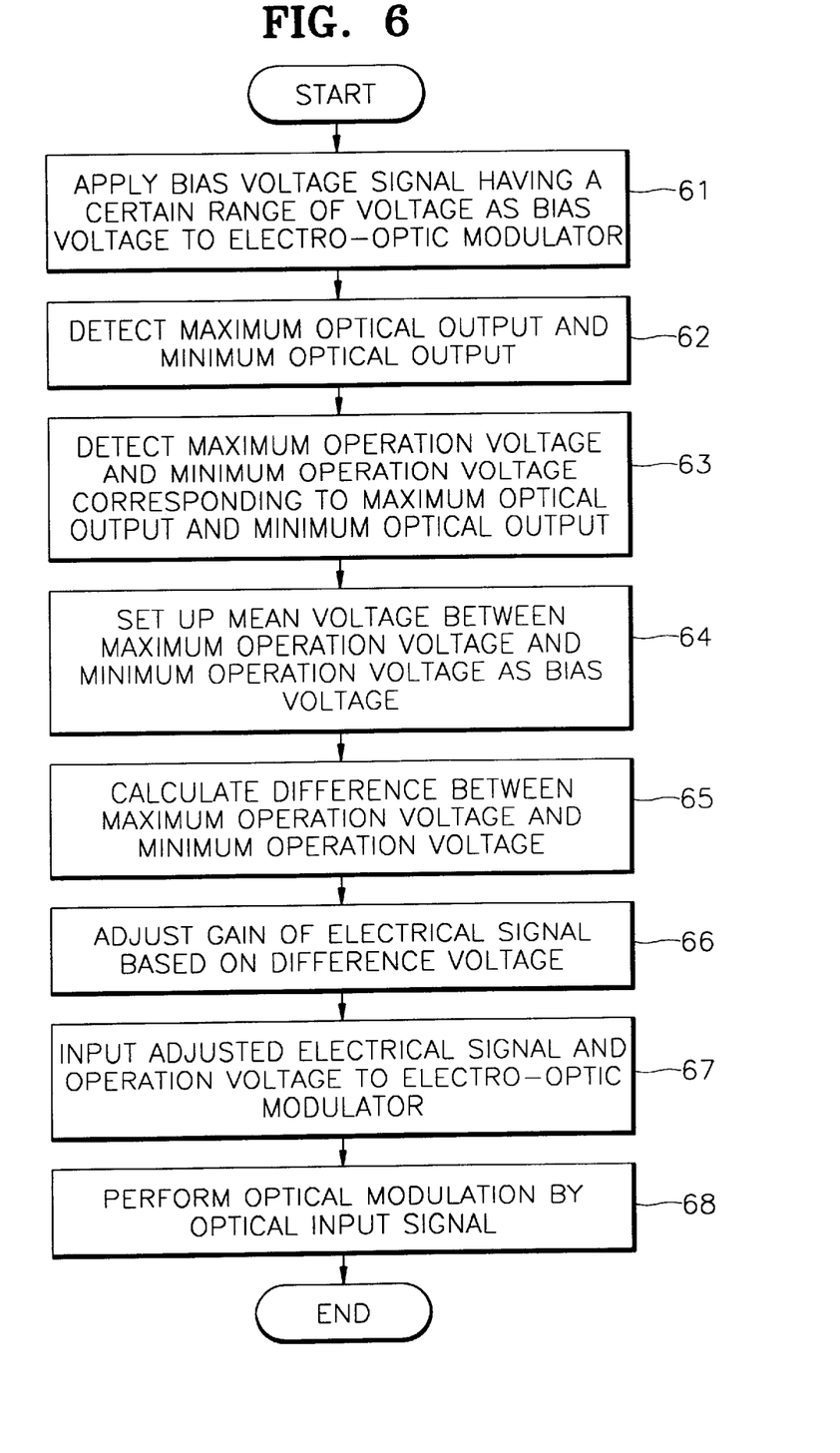
FIG. 6 is a flow diagram describing how the electro-optic modulator is controlled when it is initialized.
Figure 7:
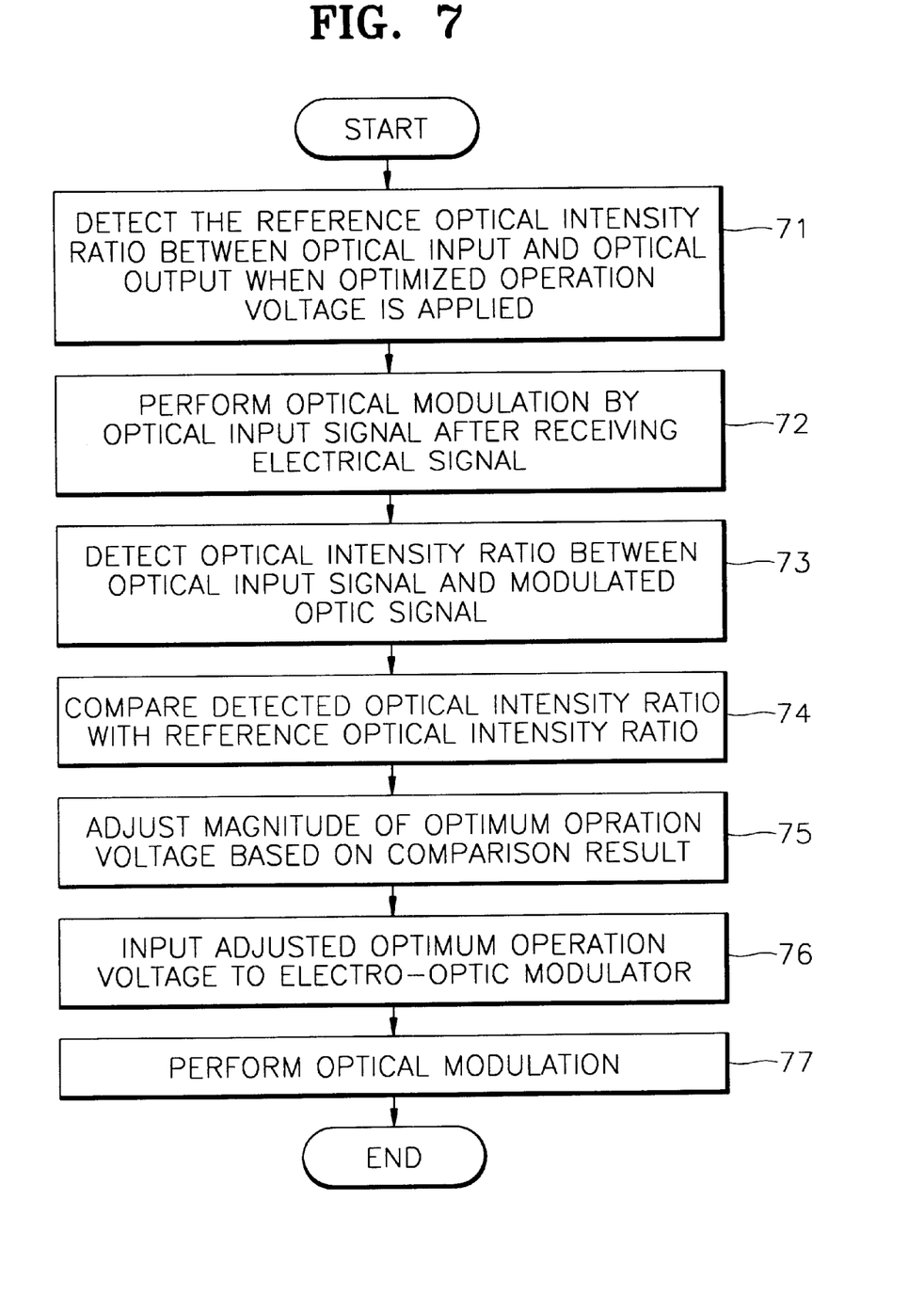
FIG. 7 is a flow diagram describing how the bias voltage is adjusted adaptively while the electro-optic modulator operates.

The controller 15 shown in FIG. 1 adjusts not only the bias voltage signal but also the gain of the electrical input signal depending on the intensity of an optical input signal and an optical output signal measured by the optical input measuring unit 13 and the optical output measuring unit 14 respectively. The initialization procedure and adjustment procedure during operation of the electro-optic modulator 12 will be described with reference to FIGS. 6 and 7. FIG. 6 is a flow diagram showing the method for controlling the electro-optic modulator when it is initialized. FIG. 7 is a flow diagram showing the method for controlling the electro-optic modulator by adjusting the bias voltage adaptively while the electro-optic modulator is operated.

With reference to FIG. 6, functions will be described when the operation of the electro-optic modulator 12 is initialized. When the electro-optic modulator is initialized, the controller 15 applies a bias voltage signal having a certain range of voltage (−V~+V) as the bias voltage to the electro-optic modulator 12 in order to initialize the bias voltage in step 61, and measures the optical intensity in step 62. Based on the measurement result, the controller detects the maximum operation voltage of the bias voltage signal indicating the maximum optical intensity, and the minimum operation voltage of the bias voltage signal indicating the minimum optical intensity in step 63. In FIG. 2, if the bias voltage of 22a is applied, the maximum optical intensity is obtained. If the bias voltage of 22e is applied, the minimum optical intensity is obtained. While the applied voltage is varied, the above operation points can be found.

After detecting the maximum operation voltage and the minimum operation voltage, the controller sets up the middle voltage of the maximum and the minimum operation voltages, that is preferably the mean voltage, as an initial bias voltage signal in step 64. Then, at the optimum operation point 22c shown in the transfer function of FIG. 2, the electro-optic modulator can operate. Meanwhile, the controller calculates the difference between the minimum operation voltage and the maximum operation voltage in step 65. Then, based on the difference, the controller sets up amplification gain applicable to adjustment of the amplitude of the electrical signal inputted to the electro-optic modulator 12 in step 66. The above difference value indicates the bias voltage where the phase difference of the optic signals transmitted via the two optical waveguides 12a and 12b of the electro-optic modulator 12 is 180 degrees. The difference value is also equivalent to the difference between the voltages of operation points 22e and 22a shown in FIG. 2. The controller adjusts the gain of the amplifier that amplifies the electrical signal in order to obtain the voltage (Vp-p) of the electrical signal corresponding to the 180° phase modulation voltage (Vpi).

During the initialization, setting up the initial bias voltage and adjusting the gain of the electrical signal can operate simultaneously or only one can be operated selectively if necessary. With the initialization function, the controller can find automatically the initial operation point with regard to the initial bias voltage signal, and operate the electro-optic modulator so that the optimum extinction ratio can be maintained.

The electrical signal gain adjustment unit 17 adjusts the amplitude of the electrical input signal depending on the amplification gain set up during the initialization and applies the adjusted signal to the electro-optic modulator 12. The bias voltage adjustment unit 16 applies the initial bias voltage signal set up during the initialization to the electro-optic modulator 12 in step 67. The electro-optic modulator 12 receives the signals and performs modulation depending on the optical signal transmitted by the light source 11 in step 68.

FIG. 7 shows the method for adjusting the bias voltage adaptively depending on the change of the operation point while the optical modulation is performed after the electro-optic modulator 12 is initialized.

The initialized bias voltage is applied to the electro-optic modulator 12. The reference is set up in step 71, which is on the relation between the intensity of the optical input signal inputted to the electro-optic modulator 12 and the intensity of the optical output signal outputted from the electro-optic modulator 12. It is preferable that the reference can be set up as the intensity ratio between the optical input and the optical output so that it can be verified how the intensity of the optical output is changed as the optical input changes. The electro-optic modulator 12 performs an optical modulation in response to the electrical input signal in step 72. The relation (for example, optical intensity ratio) between the intensity of the optical signal inputted to the electro-optic modulator 12 and the intensity of the optical signal outputted from the electro-optic modulator 12 during the optical modulation are obtained in step 73. In step 74, the obtained relation is compared with the reference.

The bias voltage adjustment unit 16 adjusts the operation voltage of the bias voltage signal to be inputted to the electro-optic modulator 12 based on the comparison result of the controller 15 so that the operation voltage can be optimized, in step 75. The bias voltage adjustment unit 16 increases or decreases the operation voltage of the bias voltage signal based on the comparison result, and applies the adjusted operation voltage as the bias voltage signal to the electro-optic modulator 12 in step 76. The electro-optic modulator 12 performs the optical modulation in response to the adjusted bias voltage signal in step 77.

To be more specific, if the reference ratio which is set up during the initialization is higher than the intensity ratio obtained in step 73, the voltage value (−delta V) to reduce the bias voltage is generated. If the reference ratio is lower than the intensity ratio, the voltage value (+delta V) to increase the bias voltage is generated. The initial bias voltage and the generated voltage value are added to generate the adjusted operation voltage. In the register of the controller 15, the adjusted bias voltage is updated. The newly adjusted bias voltage is converted to an analog signal which is applied to the electro-optic modulator 12 as the bias voltage signal. Thus, the optical output signal of the electro-optic modulator can be stabilized. The operation voltage of the bias voltage signals can be periodically adjusted during the operation of the electro-optic modulator or whenever necessary.

Figure 5:
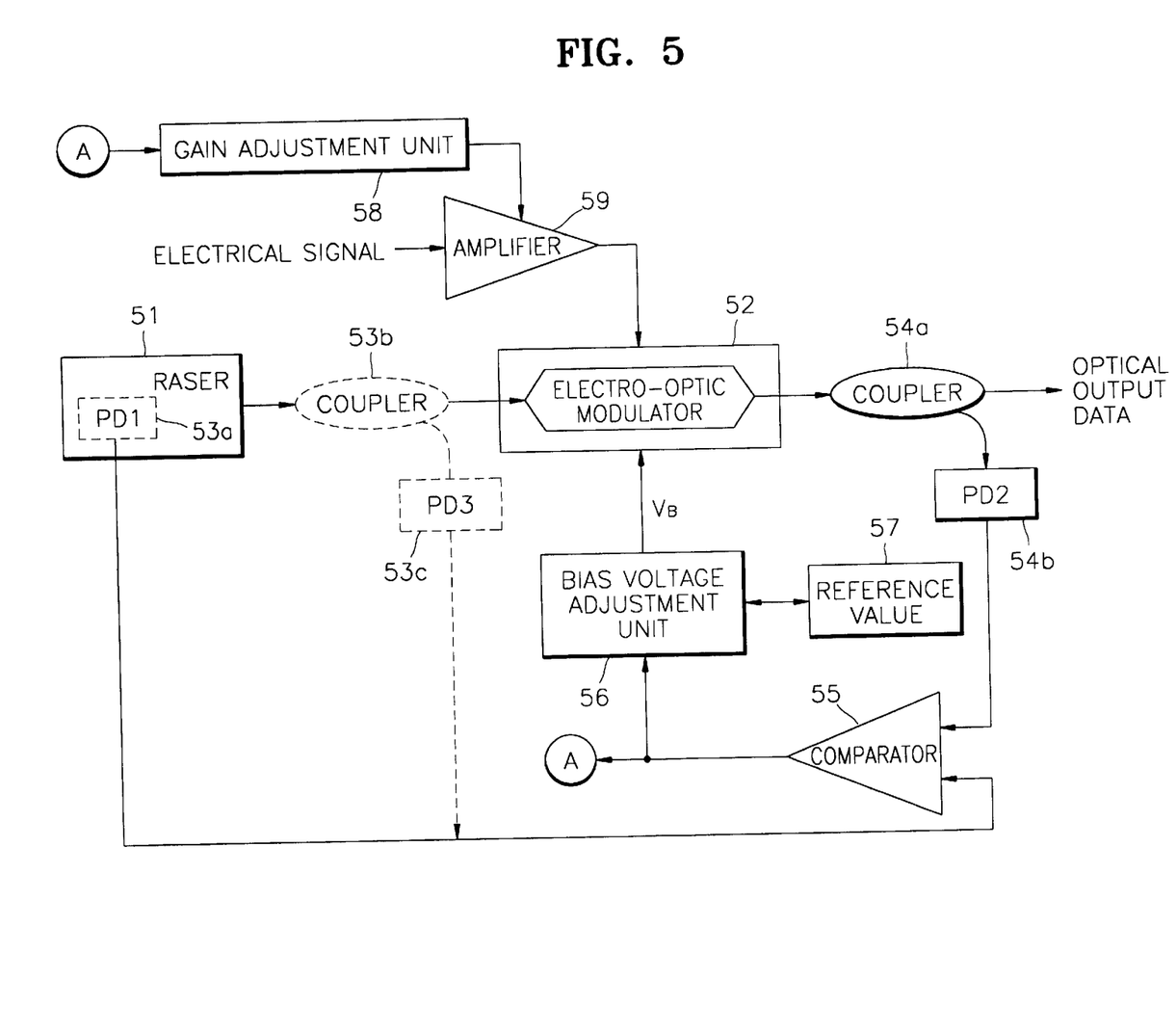
FIG. 5 is a block diagram showing a control device for controlling the electro-optic modulator according to another embodiment of the present invention.

FIG. 5 is a block diagram showing a control device for controlling the electro-optic modulator according to another embodiment of the present invention. The input light source may be a laser device 51. A built-in photo diode (PD1, 53a) is included to measure the intensity of the laser beam. If the optical measuring element is not included in the laser device 51, a coupler 53b is inserted on the light path from the laser device 51 to the electro-optic modulator 52. A photo diode (PD3, 53c) can measure the intensity of the optical input signal by measuring some parts of the light inputted to the electro-optic modulator 12. The function of the electro-optic modulator 52 is the same as that shown in FIG. 1. The coupler 54a inputs some of the light outputted from the electro-optic modulator 52 to a photo diode (PD2, 54b) which measures the intensity of the optical output signal.

The function during the initialization of the operation of the electro-optic modulator 52 is described below. During the initialization of the electro-optic modulator 52, a signal having a certain range of voltage is applied to the electro-optic modulator 52 as the bias voltage signal. The comparator 55 receives the optical input signal and the optical output signal, detects the maximum operation voltage indicating the maximum optical intensity and the minimum operation voltage indicating the minimum optical intensity, and outputs the mean voltage and the difference voltage. The reference value setup unit 57 sets up and stores the operation voltage of the bias voltage signal depending on the mean voltage outputted from the comparator 55. In addition, the reference value setup unit 57 sets up and stores a parameter that adjusts the gain of the electrical signal inputted to the electro-optic modulator 52 based on the difference voltage outputted from the comparator 55.

The gain adjustment unit 58 adjusts a gain of the amplifier 59 that amplifies the amplitude of the electrical signal. The amplifier 59 is controlled depending on the adjusted gain. The electrical signal amplified by the amplifier 59 is applied to the electro-optic modulator 52. The bias voltage adjustment unit 56 applies the bias voltage signal having the operation voltage that is set up during the initialization to the electro-optic modulator 52.

The electro-optic modulator 52 is operated using the parameters obtained in the above initialization, and the intensity of the optical output and the optical input is continuously monitored. If the intensity ratio (optical intensity of the PD1 over optical intensity of the PD2) of the optical input and the optical output becomes different from the initial setup value, the operation voltage of the bias voltage signal is adjusted. The detailed adjustment is the same as that shown in FIG. 1.

The 180° phase modulation voltage (Vpi) may be monitored only during initialization, and thus, the gain of the electrical signal is adjusted. During the optical modulation, the 180° phase modulation voltage (Vpi) may not be monitored. During the initialization, the Vpi is found out while the operation voltage of the bias voltage signal of the electro-optic modulator is increased from low value to high value. Changing the voltage of the bias voltage signal in order to find out the Vpi during the optical modulation may cause the distortion of the electrical information signal. The Vpi may be changed if the electro-optic modulator operates for a long time (for about several months) or in case temperatures change drastically (for example, change from 0° C. to 70° C.) but there is little change in Vpi in case that temperature change is not severe or the electro-optic modulator operates only for a short period of time. If the optimized gain of the electrical signal is set up depending on the Vpi of initialization, the optical modulation can be performed normally. Therefore, if the electro-optic modulator is used for a long time or temperatures change drastically, the optical modulation characteristics may be distorted. In that case, it is preferable that the initialization of the electro-optic modulator should start with the first procedure.

With reference to figures, the method for controlling the electro-optic modulator is described. However, analog to digital conversion or digital to analog conversion is not explained. For example, the photo diode measures the intensity of the optical input or the optical output and outputs the analog intensity signal. Then, the analog to digital converter converts the measured analog intensity signal to a digital signal and inputs the digital signal to the controller. In addition, the digital to analog converter converts into an analog signal the offset value for adjusting a gain or the bias operation value outputted from the controller. Then, the digital to analog converter applies the analog signal to the electro-optic modulator or the amplifier. That is, in the embodiment of the present invention, the detailed description on the above is omitted. In fact, those who are skilled in the art can implement the control device that converts the analog signals into digital signals, or vice versa.

In addition, the present invention can be implemented as a computer-readable code in the computer-readable recording media. The computer-readable recording media include all types of recording devices where data that can be read by the computer system is stored. The computer-readable recording media include ROM, RAM, CD-ROM, a magnetic tape, a floppy disc and an optical data storage device. In addition, the present invention can be implemented in the form of a carrier wave (for example, transmission over the Internet). The computer-readable recording media can be distributed to the computer systems in a network and stored and executed as computer-readable codes in a distributed way.

Although specific embodiments of the invention have been described herein for illustrative purposes, various modifications and equivalents thereof can be made without departing from the spirit and scope of the invention, as will be recognized by those skilled in the relevant art. Accordingly, the invention is not limited to the disclosure, but instead its scope is to be determined entirely by the following claims.

According to the present invention described above, the control device can control the electro-optic modulator by initializing bias voltage and gain of an electrical information signal so that the electro-optic modulator can operate in optimized conditions, thus preventing the optical output signal from being distorted and obtaining the maximum extinction ratio. In addition, the control device can adjust the bias voltage adaptively during the operation of the electro-optic modulator. The present invention can be used to stabilize the output characteristics of an optical transmitter, an optical transponder and an electro-optic modulator used in the optical transmitter in the optical transmission system.

What is claimed is:

1. In a control device for controlling an electro-optic modulator which receives an optical input signal, modulates the optical input signal with an electrical input signal and a bias voltage signal, and outputs the modulated optical signal, the control device for controlling the electro-optic modulator comprising:

a light source for providing the optical input signal used for the optical modulation to the electro-optic modulator;

an optical input measuring unit for measuring the intensity of the optical input signal outputted by the light source;

an optical output measuring unit for measuring the intensity of the optical output signal outputted by the electro-optic modulator; and a controller for adjusting the bias voltage signal and the gain of the electrical input signal depending on the intensity of the optical input signal and the optical output signal measured respectively by the optical input measuring unit and the optical output measuring unit.

2. The control device of claim 1, wherein the controller further comprises:

an operation voltage initialization unit for, during the electro-optic modulator, applying a bias voltage signal having a certain range of voltage as a bias voltage to the electro-optic modulator, for detecting the maximum operation voltage indicating the maximum optical intensity and the minimum operation voltage indicating the minimum optical intensity, for setting up the mean voltage between the maximum operation voltage and the minimum operation voltage as that of an initial bias voltage signal and for applying the initial bias voltage signal to the electro-optic modulator.

3. The control device of claim 1, wherein the controller further comprises:

a gain initialization unit for, during the initialization of the electro-optic modulator, applying a bias voltage signal having a certain range of voltage as a bias voltage to the electro-optic modulator, for detecting the maximum operation voltage indicating the maximum optical intensity and the minimum operation voltage indicating the minimum optical intensity and for adjusting the gain of the electrical signal inputted to the electro-optic modulator based on the difference between the maximum operation voltage and the minimum voltage operation voltage.

4. The control device of claim 1, wherein the controller further comprises:

an operation voltage controller for setting a reference on the relation between the intensity of the optical signal inputted to the electro-optic modulator and that of the optical signal outputted from the electro-optic modulator by applying an initialized bias voltage to the electro-optic modulator, for obtaining the relation between the intensity of the optical signal inputted to the electro-optic modulator and that of the optical signal outputted from the electro-optic modulator while performing an optical modulation depending on the electrical signal, for comparing the obtained relation with the reference and for adjusting the operation voltage of the bias voltage signal based on the comparison result.

5. The control device of claim 4, wherein the operation voltage controller comprises:

a reference setup unit for setting a reference on the relation between the intensity of the optical signal inputted to the electro-optic modulator and that of the optical signal outputted from the electro-optic modulator by applying an initialized bias voltage to the electro-optic modulator;

a comparator for obtaining the relation between the intensity of the optical signal inputted to the electro-optic modulator and that of the optical signal outputted from the electro-optic modulator while performing an optical modulation in response to the electrical signal and for comparing the obtained relation with the reference; and a bias applying unit for increasing or decreasing the operation voltage of the bias voltage signal based on the comparison result of the comparator, and for applying the updated operation voltage as the bias voltage signal to the electro-optic modulator.

6. The control device of claim 1, wherein the controller comprises:
   a comparator for receiving the optical output signal and the optical input signal measured respectively by the optical output measuring unit and the optical input measuring unit, and for detecting the maximum operation voltage indicating the maximum optical intensity and the minimum operation voltage indicating the minimum optical intensity and for outputting the mean voltage and the difference voltage;
   a reference value setup unit for setting up the operation voltage of the bias voltage signal depending on the mean voltage outputted from the comparator;
   a gain adjustment unit for adjusting the gain of the electrical signal inputted to the electro-optic modulator based on the difference voltage outputted by the comparator; and
   an operation voltage setup unit for setting up the mean voltage outputted by the comparator as that of the initial bias voltage signal and applying the initial bias voltage signal to the electro-optic modulator.

7. In a method for initializing an electro-optic modulator which outputs a modulated optical signal in response to an optical input signal, the method comprising:
   applying a bias voltage signal having a certain range of voltage as a bias voltage to an electro-optic modulator;
   obtaining the maximum operation voltage indicating the maximum optical intensity and the minimum operation voltage indicating the minimum optical intensity out of the detected optical outputs after the bias voltage signal having various bias voltages are applied;
   setting up the mean voltage between the maximum operation voltage and the minimum operation voltage as an initial bias voltage;
   setting a reference on the relation between the intensity of the optical signal inputted to the electro-optic modulator and that of the optical signal outputted from the electro-optic modulator by applying the initial bias voltage to the electro-optic modulator;
   measuring the intensity of the optical signal inputted to the electro-optic modulator and that of the optical signal outputted from the electro-optic modulator during the operation of the electro-optic modulator, and comparing the reference and the measured result; and
   adjusting the bias voltage based on the comparison result and applying the adjusted bias voltage to the electro-optic modulator to perform an optical modulation in response to the electrical input signal.

8. The method of claim 7 further comprising:
   adjusting the gain of the electrical signal inputted to the electro-optic modulator based on the difference between the maximum operation voltage and the minimum operation voltage.

9. In a method for controlling an electro-optic modulator which outputs a modulated optical signal in response to an optical input signal, the method comprising:
   (a) setting a reference on the relation between the intensity of the optical signal inputted to the electro-optic modulator and that of the optical signal outputted from the electro-optic modulator by applying a bias voltage signal having the initial bias voltage to the electro-optic modulator;
   (b) measuring the intensity of the optical signal inputted to the electro-optic modulator and that of the optical signal outputted from the electro-optic modulator while performing an optical modulation in response to the electrical signal;
   (c) obtaining the relation between the measured optical signals and comparing the obtained relation with the reference;
   (d) adjusting the bias voltage based on the comparison result; and
   (e) performing an optical modulation by applying the bias voltage signal having the adjusted bias voltage to the electro-optic modulator;
   controlling the bias voltage of the bias voltage signal by repeating from (b) step to (e) step.

10. The method of claim 9, wherein the maximum operation voltage indicating the maximum optical intensity and the minimum operation voltage indicating the minimum optical intensity are obtained after the bias voltage signals having various bias voltages are applied to the electro-optic modulator, and the initial bias voltage applied in (a) step is set up as the mean voltage between the maximum operation voltage and minimum operation voltage.

11. The method of claim 9, wherein the reference in step (b) can be set up as the intensity ratio between the optical input signal and the optical output signal.

12. The method of claim 9 further comprising:
   obtaining the maximum operation voltage indicating the maximum optical intensity and the minimum operation voltage indicating the minimum optical intensity after applying the bias voltage signals having various bias voltages to the electro-optic modulator, and adjusting the gain of the electrical signal inputted to the electro-optic modulator based on the difference between the maximum operation voltage and minimum operation voltage.

13. A computer-readable medium for recording a program intended to execute one method of claims 8 and 9 through 12 in a computer.

14. An optical transmitter comprising:
   an electro-optic modulator for receiving an electrical input signal and a bias voltage signal, and for outputting an optical signal modulated depending on the optical input signal;
   a light source for providing an optical input signal used for the optical modulation to the electro-optic modulator;
   an optical input measuring unit for measuring the intensity of the optical input signal outputted by the light source;
   an optical output measuring unit for measuring the intensity of the optical output signal outputted by the electro-optic modulator; and
   a controller for adjusting the bias voltage signal and a gain of the electrical input signal depending on the intensity of the optical input signal and the optical output signal measured respectively by the optical input measuring unit and the optical output measuring unit.

* * * * *